United States Patent
Jacob

[11] Patent Number: 5,647,801
[45] Date of Patent: Jul. 15, 1997

[54] CONSTANT VELOCITY JOINT

[75] Inventor: Werner Jacob, Frankfurt am Main, Germany

[73] Assignee: Lohr & Bromkamp GmbH, Offenbach am Main, Germany

[21] Appl. No.: 404,058

[22] Filed: Mar. 14, 1995

[30] Foreign Application Priority Data

Mar. 25, 1994 [DE] Germany .................. 44 10 298.4

[51] Int. Cl.$^6$ .................................................. F16D 3/224
[52] U.S. Cl. ..................... 464/145; 464/167; 464/906
[58] Field of Search ............................. 464/179, 182, 464/178, 140, 141, 139, 167, 168, 906; 403/164, 165

[56] References Cited

U.S. PATENT DOCUMENTS

| | | | |
|---|---|---|---|
| 3,368,368 | 2/1968 | Breuer et al. | 464/140 |
| 4,464,143 | 8/1984 | Bowyer | 464/906 X |
| 4,608,028 | 8/1986 | Welschof et al. | 464/906 X |
| 4,610,643 | 9/1986 | Krude | 464/906 X |
| 4,611,373 | 9/1986 | Hazebrook | 464/906 X |
| 4,767,381 | 8/1988 | Brown et al. | 464/906 X |
| 4,950,206 | 8/1990 | Jacob | 464/167 X |
| 4,968,287 | 11/1990 | Jacob | 464/906 X |
| 5,230,659 | 7/1993 | Bird et al. | 464/906 X |
| 5,356,341 | 10/1994 | Uchman et al. | 464/906 X |

FOREIGN PATENT DOCUMENTS 1142641 2/1969 United Kingdom ............ 464/167

*Primary Examiner*—Daniel P. Stodola
*Assistant Examiner*—Eileen A. Dunn
*Attorney, Agent, or Firm*—Harness, Dickey & Pierce, P.L.C.

[57] ABSTRACT

A constant velocity joint has an outer part (1) with outer running grooves provided in its inner face (2) and extending in meridian planes with reference to the longitudinal axis (4) of the outer part. An inner part (6) is arranged in the inner chamber (5) of the outer part (1). Inner running grooves (13) are arranged in the inner part outer face (10). The inner running grooves (13) are arranged opposite the outer running grooves forming pairs which jointly accommodate balls (31) for torque transmitting purposes. The balls (31) are guided by a cage (24). The inner part (6) includes inner running grooves (13) which are all shortened and are only long enough to provide a maximum travel (18) covered by the balls (31) in the inner running grooves (13) from one extreme position to the other, plus an additional safety length (19) which is provided for strength reasons. A groove portion (14, 15) follows at least one end of the inner running grooves (13). The groove portion (14, 15) has a cross-section which is extended relative to that of the inner running grooves (13). This design improves the possibilities for using non-chip-producing forming methods because the percentage of surfaces to be stamped during the forming process to achieve dimensional accuracy is reduced considerably. The material is able to flow more easily. Furthermore, a channel (32) is provided in each of the inner running grooves (13). Apart from an improved dimensional accuracy, the required forming forces are reduced considerably.

15 Claims, 2 Drawing Sheets

CONSTANT VELOCITY JOINT

BACKGROUND OF THE INVENTION

The invention relates to a constant velocity joint. The joint has a hollow outer part whose inner face, in meridian planes with reference to the longitudinal axis of the outer part, is provided with outer running grooves. The joint includes an inner part which is arranged in the inner chamber of the outer part and whose outer face, in meridian planes with reference to the longitudinal axis of the inner part, is provided with inner running grooves positioned opposite the outer running grooves. The opposed inner running grooves and outer running grooves jointly accommodate torque transmitting balls guided in windows of a cage. The cage is arranged in the intermediate space between the inner face of the outer part and the outer face of the inner part. The inner running grooves and the outer running grooves, starting from one end of the joint, are undercut-free. Also, the cage, by means of a hollow spherical partial face, is guided on an outer spherical face of the inner part.

A constant velocity joint is described in DE 37 39 867 C2 (U.S. Pat. No. 4,950,206). The inner part is produced by a non-chip-producing forming process which requires considerable forces since the material must be made to flow. In particular, for the purpose of giving the running grooves their final dimensions, the material in the region of the running grooves must be displaced, which, in the case described, can only be achieved by full-surface and compressive pressure which adversely effects the accuracy to be observed. The tools accommodating the inner part during the forming operation expand under high pressure. Furthermore, the energy consumption of this forming method is high.

SUMMARY OF THE INVENTION

It is an object of the invention to provide a constant velocity joint with an inner part and/or outer part whose production does not require high forces. This is characterized by a low energy consumption, but which, at the same time, can be produced by a non-chip-forming method to achieve a high degree of accuracy of the functionally important contours.

In accordance with the invention, the running grooves of the inner part and/or of the outer part are limited to a length which is composed of the travel of the balls in the running grooves plus safety length at the two ends. The travel results when, during rotation, the inner part is articulated relative to the outer part at the maximum design articulation angle. At least at one end, the running grooves each change into a groove portion whose cross-section is extended relative to the running grooves. The inner part or the outer part including the shortened running grooves is produced by a non-chip-producing forming operation.

By shortening the running grooves, especially the inner running grooves, to a maximum length which, during articulation of the inner part relative to the outer part, corresponds to the travel of the balls from the one extreme position to the other extreme position, when the longitudinal axis of the outer part and the longitudinal axis of the inner part are positioned in one plane, plus a safety length provided at the ends for strength reasons, the area to be produced by a non-chip-forming operation, so as to be dimensionally accurate, is reduced considerably.

A further reduction in force is achieved by using the extended groove portion axially adjoining the running grooves to accommodate the displaced material when the shortened running grooves are stamped to their final dimensions. This also results in an improved dimensional accuracy during the non-chip-producing forming operation and thus closer tolerances. The non-chip-producing forming operation can take place in several stages, where the final stage is a full stamping operation which takes place between two tools and which extends at least to the running grooves. However, preferably, in addition to the running groove, all functional surfaces, such as the outer spherical face of the inner part which serves to guide the cage, are simultaneously stamped to their final dimensions. The forming operation takes place in the form of a displacement stamping operation which has the advantages of reduced energy consumption and improved accuracy.

As far as the cross-section of the inner running grooves and the way in which they extend across their operating region is concerned, a suitable solution is described in DE 39 04 655 C1 (U.S. Pat. No. 4,968,287).

A further reduction in the necessary deformation force is accompanied by a further improvement in dimensional accuracy by which the inner running grooves are provided with at least one channel extending along their length. The safety length is preferably dimensioned such that when the balls occupy their extreme positions, upon maximum articulation of the inner part relative to the outer part, they can still be securely held and controlled.

The characteristics of the invention have been found to be particularly advantageous in a joint designed as a constant velocity fixed joint, at the end where the undercut-free portion starts, where the outer part, including the outer running grooves, is closed by a closing part. Also, the inner part, towards the closing part, is provided with a guiding face designed as a spherical face. Furthermore, the outer spherical face is arranged at the end of the inner part facing away from the guiding face.

If the inner part and the outer part are centered relative to one another, on the one hand, as a result of the guiding face of the inner part supported against a supporting face of the closing part, or of a guiding element supported thereon, in the direction of the longitudinal axis of the outer part and on the other hand, as a result of the balls supported in the outer running grooves and in the cage, with a certain amount of play existing between the outer face of the cage and the inner face of the outer part, an outer part may be used in the form of a formed plate metal part or in the form of a separate part manufactured by a non-chip-producing forming operation.

According to a further preferred embodiment, the inner part and the outer part are centered relative to one another, on the one hand; as a result of the guiding face supported against the supporting face of the closing part, or of a guiding element supported thereon, in the direction of the longitudinal axis of the outer part and on the other hand; as a result of the cage, by means of a spherical outer face, guided on a hollow spherical face of the outer part.

DE 37 39 867 C2 (U.S. Pat. No. 4,950,206) discloses an embodiment where the inner part is guided directly on a closing part face corresponding to the guiding face. DE 42 08 786 C1 and in Patent Application P 43 17 606.2, propose an embodiment where a separate guiding element is provided. With reference to both embodiments it is additionally proposed that, for the purpose of setting functional play values, the closing part is adjustable relative to the outer part.

In cases where a separate guiding element is provided the latter is preferably radially, with reference to the longitudinal axis of the outer part, and movably supported on the closing part.

Furthermore, it is advantageous for the inner part, between the outer spherical face and the guiding face, to be provided with a free face which, relative to the two faces, is stepped towards the joint center. As a result or this measure, the friction conditions are advantageously affected since the number of friction faces is reduced. This also applies if the outer spherical face of the inner part ends in front of a transverse plane containing the joint center.

In accordance with the invention, the cage-guiding outer spherical face of the inner part, as far as its diameter is concerned, corresponds to the spherical guiding face. Also, the centers of the guiding face and outer spherical face are centered on the joint center. In cases where a separate guiding element is provided, the guiding face may be provided in the form of a hollow spherical partial face. Such a design principle is known from DE 42 08 786 and the German Patent Application P 43 17 606.2. In such a case it is desirable for the guiding face to be provided with channels which also extend in meridian planes with reference to the longitudinal axis or the inner part. The surfaces to be stamped are reduced in size and the necessary deformation force decreases. Furthermore, the channels may be used as storage chambers for grease which may be used for lubricating the surfaces of the inner part and guiding element which slide on one another.

From the following detailed description, accompanying drawings and subjoined claims, other objects and advantages will become apparent to those skilled in the art.

BRIEF DESCRIPTION OF THE DRAWINGS

The channels in the guiding face are preferably diagrammatically illustrated in the drawing wherein.

DETAILED DESCRIPTION OF THE PREFERRED EMBODIMENT

Figure 1:
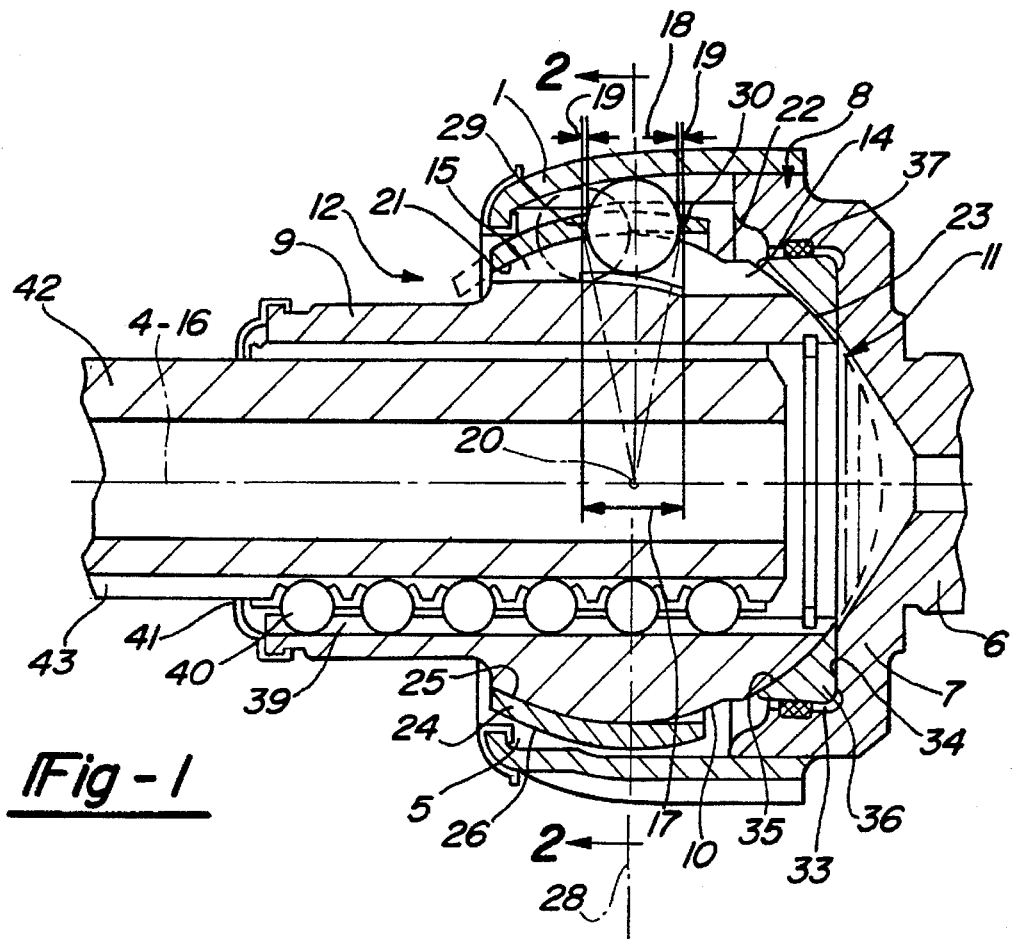
FIG. 1 is a longitudinal section view along line I—I of FIG. 2 through a first embodiment of a constant velocity joint in accordance with the invention, with the outer part and inner part in the extended condition.
Figure 2:
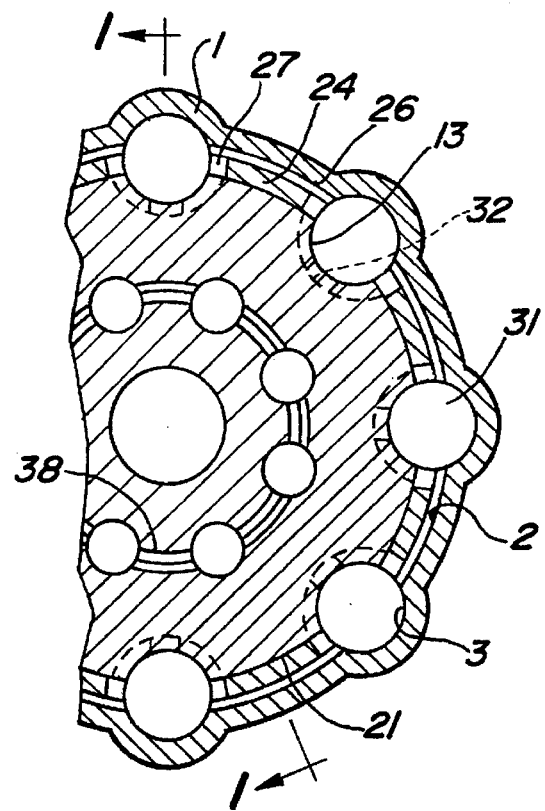
FIG. 2 is partial cross-section view according to FIG. 1 along line II—II of FIG. 1.
Figure 3:
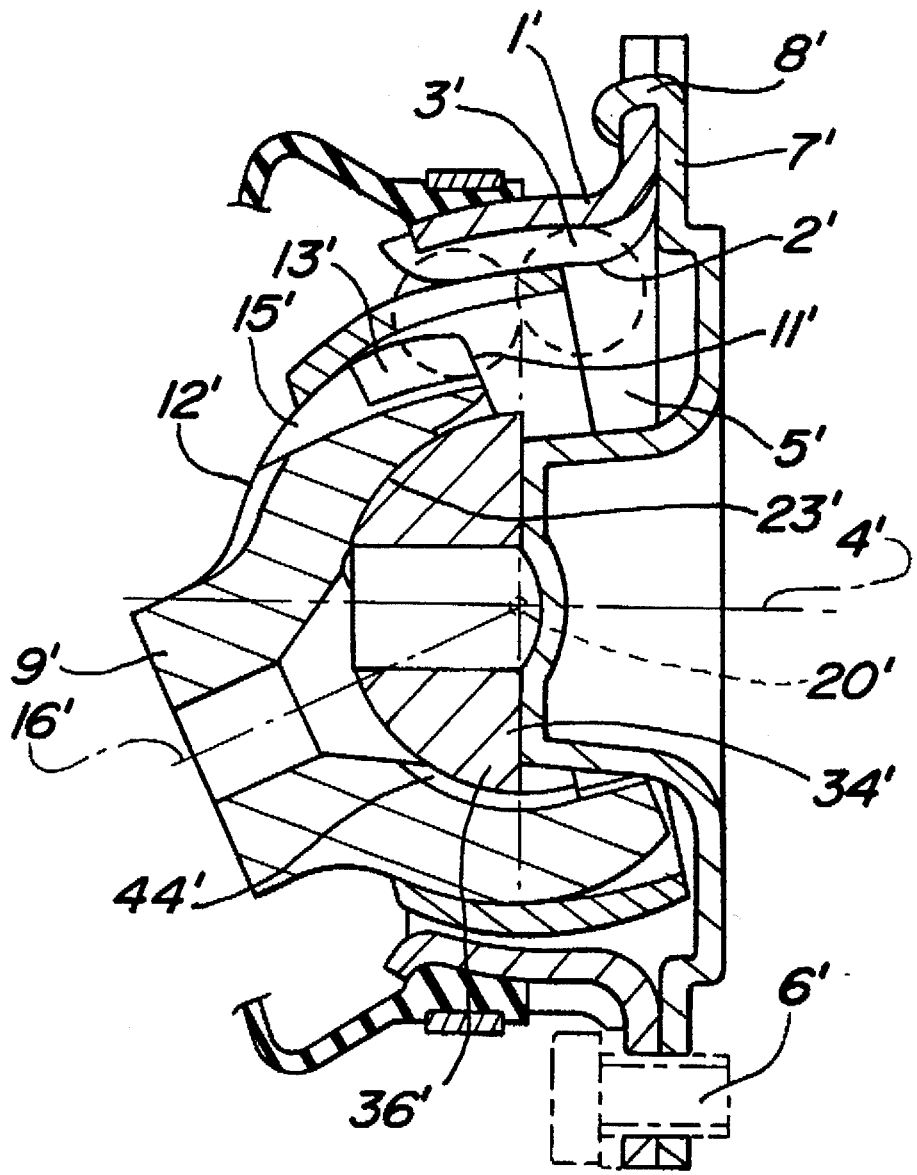
FIG. 3 is a longitudinal section view through a second embodiment of a joint in accordance with the invention, with the inner part articulated relative to the outer part and with the section extending along the same line as in FIG. 1.

FIGS. 1 and 2 show a first embodiment of a constant velocity universal ball joint in the form of a fixed joint. The constant velocity joint includes an outer part 1 in the form of a hollow plate metal part. The inner chamber of the outer part has been given the reference number 5 and its inner face has been given the reference number 2. Outer running grooves 3 are provided in the inner face 2 of the outer part 1. The grooves 3 extend in meridian planes with reference to the longitudinal axis 4 of the outer part. The outer part 1 also includes a closing part 7. The closing part 7 includes connecting means 6 in the form of a journal or the like to connect the outer part 1 to a rotatingly driving or driven part. The closing part 7 is designed to achieve a non-rotating connection with the outer part 1. The closing part 7 is connected to the outer part 1 by a weld 8 such as by a continuous electron beam weld or a plurality of circumferentially welding distributed spots. A non-rotating connection is achieved by projections of the closing part engaging several of the outer running grooves 3.

An inner part 9 is arranged in the inner chamber 5 of the outer part 1. The inner part 9 includes an outer face 10 having a plurality of portions. Circumferentially distributed inner running grooves 13 are provided on the outer face 10. The grooves 13 extend in meridian planes with reference to the longitudinal axis 16 of the inner part and are each arranged opposite an outer running groove 3 of the outer part 1. Starting from the end 11 of the joint, the inner running grooves 13 and the outer running grooves 3 are designed to be undercut-free. The closing part 7 is also arranged toward the end 11. The end 11 is thus the closed end of the joint, whereas the opposed end 12 constitutes the open end of the joint from where the inner part 9 is accessible for the purpose of introducing a shaft.

The inner running grooves 13 extend over only a small portion of the axial length of the inner part 9. Towards both ends 11, 12, the inner running grooves 13 are followed by grove portions 14, 15 whose cross-section is extended relative to that of the inner running grooves 13. Starting from the end 11, the inner running grooves 13 are undercut-free. With reference to the longitudinal axis 16 of the inner part, the running grooves 13 have a length 17, limited to a length defined by travel of the balls in the running grooves, and safety lengths 19 at each end. The inner running grooves 13 include channels 32 which extend along the length of the grooves 13 and are arranged in the base of grooves 13. The ball travel length 18 will be described below in greater detail.

The joint center around which the inner part 9 may be articulated relative to the outer part 1 has been given the reference number 20. Towards the end 12, the outer face 10 of the inner part 9 includes an outer spherical face 21 whose center is centered on the joint center 20. Towards the end 11, there is provided a guiding face 23 which is also designed as a spherical partial face and whose center is also centered on the joint center 20. The outer spherical face 21 ends in front of a transverse plane 28 which intersects the longitudinal axis 16 of the inner part in the joint center 20 at a right angle, viewing the transverse plane 28 from the end 12.

Between the end 12 and the guiding face 23 a free face 22 is provided which is stepped towards the outer spherical face 21 and the guiding face 23. The outer spherical face 21 and the guiding face 23 preferably have the same radius of curvature. The free face 22 leaves a free space towards an imaginary continuation of an envelope whose diameter corresponds to the ball diameter of the outer spherical face 21 and the guiding face 23.

A cage 24 is arranged in the space between the inner face 2 of the outer part 1 and the outer face 10 of the inner part 9. The cage 24 includes a hollow spherical partial face 25 by means of which it is guided on the outer spherical face 21 of the inner part 9. Furthermore, the cage 24 includes a substantially spherical outer face 26 arranged at a distance from the inner face 2 of the outer part 1. The cage 24 has circumferentially extending windows 27 which are distributed in accordance with the distribution of the outer running grooves 3 and the inner running grooves 13. The outer running grooves 3 and the opposed inner running grooves 13 each accommodate a ball 31. Each ball 31 is guided in a window 27 of the cage 24.

When articulating the joint, starting from the extended position of the outer part 1 relative to the inner part 9 wherein the longitudinal axis 4 of the outer part is aligned with the longitudinal axis 16 of the inner part and wherein, for example, the inner part 9 is articulated relative to the outer part 1 around the joint center 20 clockwise in the drawing plane according to FIG. 1, the position of the balls 31 changes in that the balls 31, together with the cage 24, move towards the right into the dash-dotted position shown to the right of the balls illustrated in continuous lines. The point of contact between the inner running groove 13 and the ball 31 is obtained in a point of intersection of a plane extending at a right angle relative to the longitudinal axis 16 of the inner part through the center of the ball 31 and the joint center 20, with the inner running groove 13. As a result, the one end of the ball travel 18 is obtained in the form of the extreme position 30. When pivoting the inner part 9 counter-clockwise relative to the outer part 1 out of a position according to FIG. 1 around the joint center 20, one achieves the extreme position 29. The distance between the two extreme positions 29, 30, if projected onto the longitudinal axis of the inner part, constitutes the ball travel 18. However, the length 17 of the inner running grooves 13 is increased at its ends by a safety length 19, again with reference to the longitudinal axis 16 of the inner part. In particular, the safety lengths 19 are provided because even in the extreme positions 29, 30, the balls have to be safely guided and controlled. This applies in the view of the tolerances occurring.

The closing part 7 is provided with a recess 33 which includes a supporting face 34 which extends radially with reference to the longitudinal axis 4 of the outer part. A guiding element 36 is radially movably guided in the recess 33, thus the closing part is adjustable relative to the outer joint part. By means of a planar face, the guiding element 36 movably rests against the supporting face 34. Between the outer circumferential face of the guiding element 36 and the delimiting wall of the recess 33, a resilient ring 37 is arranged which holds the guiding element 36, but permits the radial adjustment of same. Furthermore, at its end facing away from the supporting face 34, the guiding element 36 includes a guiding face 35. The guiding face 35 is designed as a hollow spherical partial face with the guiding face 23 of the inner part 9 axially resting thereagainst.

When assembling the joint, the pre-assembled unit, for example, which includes the inner part 9, the cage 24 and the balls 31 is inserted into the outer part 1. Subsequently, the closing part 7, together with the guiding element 36, held thereon by the resilient ring 37, is inserted into the outer part 1 and the entire unit is moved to the left in FIG. 1 far enough for the functional play value to occur, whereupon the closing part 7 is secured to the outer part 1 by the weld 8.

Furthermore, the inner part 9 includes a bore 38 centered on the longitudinal axis 16 of the inner part. The bore 38 is provided with circumferentially distributed running grooves 39. The running grooves 39 are positioned opposite the running grooves 43 of a shaft 42 inserted into the bore 38. The running grooves 39, 43, in pairs, accommodate balls 40 which are distributed along the longitudinal axis 16 of the inner part and held by a cage 41, thereby permitting a longitudinal adjustment between the inner part 9 and the shaft 42. The inner part 9 is manufactured by one or a plurality of non-chip-producing forming operations. As a result of the groove portions 14, 15, adjoining the running grooves 13 and having an extended cross-section, and the channels 32 in the base of the running grooves 13, a smaller number of contact faces is obtained, which reduces the energy consumption during the non-chip-producing forming operation. Dimensional accuracy is also improved as a result of the lower force and as a result of the material being able to escape during the forming process. Also, the tools receiving the inner part 9 are subjected to lower loads. The material flows more quickly. Inner parts 9 of the type described are preferably produced from a case-hardenable steel.

The second embodiment of a joint in accordance with the invention includes an outer part 1' in the form of a plate metal part associated with a closing part 7' which is connected to the outer part 1' by deformed portions 8'. The inner part 9' is provided with a guiding face 23' for a guiding element 36'. The guiding face 23' is designed as a hollow spherical partial face whose center is centered on the joint center 20'.

The guiding face 23', designed as a hollow spherical partial face, is provided with channels 44'. The channels 44 are distributed in meridian planes relative to the longitudinal axis 16' of the inner part. The channels 44' are circumferentially offset relative to the inner running grooves 13' by half a pitch corresponding to the distance between the inner running grooves 13'. The channels 44' reduce the surface percentage of the guiding face 23'. Furthermore, free spaces are produced which allow material to flow during the stamping operation. This permits the guiding face 23', in the form of a hollow spherical partial face, and the inner running grooves 13' to be produced by a non-chip-forming operation. The inner running grooves 13' start directly from the end 11', so that towards the end 12' there exist only groove portions 15' which have a greater cross-section than the inner running grooves 13'.

The closing part 7' includes a recess in the direction of the guiding element 36' received in the guiding face 23'. The recess includes a supporting face 34' at which the guiding element 36' is movably arranged. The guiding element 36', via a corresponding supporting face, rests against the supporting face 34' radially with reference to the longitudinal axis 4 or the outer part.

With reference to the shortened running grooves, the invention is also applicable to outer parts if these are solid parts.

While the above detailed description describes the preferred embodiment of the present invention, the invention is susceptible to modification, variation, and alteration without deviating from the scope and fair meaning of the subjoined claims.

What is claimed is:

1. A constant velocity joint comprising:

a hollow outer part having an inner face and outer running grooves in meridian planes with reference to a longitudinal axis of the outer part;

an inner part is arranged in an inner chamber of the outer part, inner running grooves are provided in an outer face of the inner part in meridian planes with reference to the longitudinal axis of the inner part;

said inner running grooves positioned opposite the outer running grooves, with the opposed inner running grooves and outer running grooves jointly accommodating torque transmitting balls;

a cage is arranged in an intermediate space between the inner face of the outer part and the outer face of the inner part, said cage includes windows for guiding said torque transmitting balls;

said inner running grooves and said outer running grooves starting from one end of the joint, being undercut-free, said cage, via a hollow spherical partial face being guided on said outer face of the inner part;

said running grooves of at least one of the inner part and the outer part include a limited length and a safety length, the limited length is defined by the travel distance of the balls in the running grooves when the inner joint, during rotation, is articulated at a maximum design angle relative to the outer joint; and at least at one end of said limited length, said running grooves include a second groove portion whose cross-section is extended relative to the limited length groove portion of the running grooves.

2. A constant velocity joint according to claim 1, wherein the inner running grooves are provided with at least one channel.

3. A constant velocity joint according to claim 1, wherein the safety length is dimensioned such that, taking into account the resulting tolerances, the balls are guided even in the safety lengths positions.

4. A constant velocity joint according to claim 1, wherein the outer part having the outer running grooves is closed by a closing part and said inner part, towards the closing part, is provided with a guiding face designed as a spherical face and the outer spherical face is arranged at the end of the inner part facing away from the guiding face.

5. A constant velocity joint according to claim 4, wherein said inner part and outer part are centered relative to one another, as a result of the guiding face of the inner part being supported in the direction of the longitudinal axis of the outer part and as a result of the balls being supported in the outer running grooves and in the cage, a certain amount of play exists between an outer face of the cage and an inner face of the outer part.

6. A constant velocity joint according to claim 5, wherein radially relative to the longitudinal axis of the outer part, the guiding element is movably supported on the closing part.

7. A constant velocity joint according to claim 5, wherein for the purpose of setting the functional play values, the closing part is adjustable relative to the outer part in the direction of the longitudinal axis of the outer part.

8. A constant velocity joint according to claim 4, wherein the other spherical face of the inner part ends adjacent a transverse plane containing the joint center.

9. A constant velocity joint according to claim 4, wherein between the outer spherical face and the guiding face, the inner part is provided with a free face which, relative to said two faces, is stepped towards the joint center.

10. A constant velocity joint according to claim 4, wherein the inner part and the outer part are centered relative to one another as a result of the guiding face being supported against the supporting face of the closing part or of a guiding element supported thereon in the direction of the longitudinal axis of the outer part and as a result of the cage, via a spherical outer face, being guided on a hollow spherical face of the outer part.

11. A constant velocity joint according to claim 10, wherein radially relative to the longitudinal axis of the outer part, the guiding element is movably supported on the closing part.

12. A constant velocity joint according to claim 4, wherein the guiding face of the inner part being provided in the form of a hollow spherical partial race.

13. A constant velocity joint according to claim 12, wherein the guiding face designed as a hollow spherical partial face includes channels extending in meridian planes with reference to the longitudinal axis of the inner part.

14. A constant velocity joint according to claim 13, wherein the channels in the guiding faces are each arranged between two adjoining inner running grooves.

15. A constant velocity joint according to claim 4, wherein the outer spherical face of the inner part serves to guide the cage corresponding to a spherical guiding face, and the centers of the guiding face and of the outer spherical face are centered on the joint center.

* * * * *

UNITED STATES PATENT AND TRADEMARK OFFICE
CERTIFICATE OF CORRECTION

PATENT NO. : 5,647,801
DATED : July 15, 1997
INVENTOR(S) : Werner Jacob

It is certified that error appears in the above-identified patent and that said Letters Patent is hereby corrected as shown below:

Column 2, lines 57-58, after "DE 42 08 786 C1", please insert
--(US-SN 03 25 02)--

Column 2, line 58, after "P 43 17 606.2", please insert
--(US-SN 24 98 73)--

Column 3, line 4, "or" should be --of--

Column 3, line 17, after "P 43 17 606.2", please insert
--(US-SN 24 98 73)--

Column 4, line 16, "grove" should be --groove--

Signed and Sealed this

Seventh Day of April, 1998

Attest:

BRUCE LEHMAN

*Attesting Officer*   Commissioner of Patents and Trademarks